United States Patent [19]

Neill et al.

[11] Patent Number: 5,225,962
[45] Date of Patent: Jul. 6, 1993

[54] DISTRIBUTION BOARD WITH REAR ELECTRICAL ACCESS

[75] Inventors: Kenneth Neill; Keith W. Ball, both of Swindon, England

[73] Assignee: Square D Company, Palatine, Ill.

[21] Appl. No.: 849,243

[22] Filed: Mar. 11, 1992

[51] Int. Cl.⁵ ............................................. H02B 1/00
[52] U.S. Cl. ................................ 361/357; 361/338; 361/342; 361/361; 361/391; 361/430
[58] Field of Search .................... 361/334, 338–342, 361/353–361, 363, 376, 427, 390, 391, 392, 394, 430, 431; 337/6, 146

[56] References Cited

U.S. PATENT DOCUMENTS

| | | | |
|---|---|---|---|
| 2,542,853 | 2/1951 | Wills | 361/338 |
| 4,496,916 | 1/1985 | Carpenter et al. | 337/6 |
| 4,602,312 | 7/1986 | Takahashi | 361/342 |

FOREIGN PATENT DOCUMENTS 0086954 8/1983 European Pat. Off. ............ 361/399

Primary Examiner—Gregory D. Thompson
Attorney, Agent, or Firm—Larry I. Golden; David R. Stacey; Timothy H. Gens

[57] ABSTRACT

The present invention relates to a distribution board for electrical power which provides rear electrical access to connect busbars and switch modules together. The distribution board includes a framework for supporting electrical components, a switch compartment for receiving at least one switch module, and a terminal compartment for connecting outlet terminals from the switch module to outgoing lines. The present invention also includes a switch unit which utilizes a housing having a rear face. The rear face incorporates both input and output terminals.

17 Claims, 3 Drawing Sheets

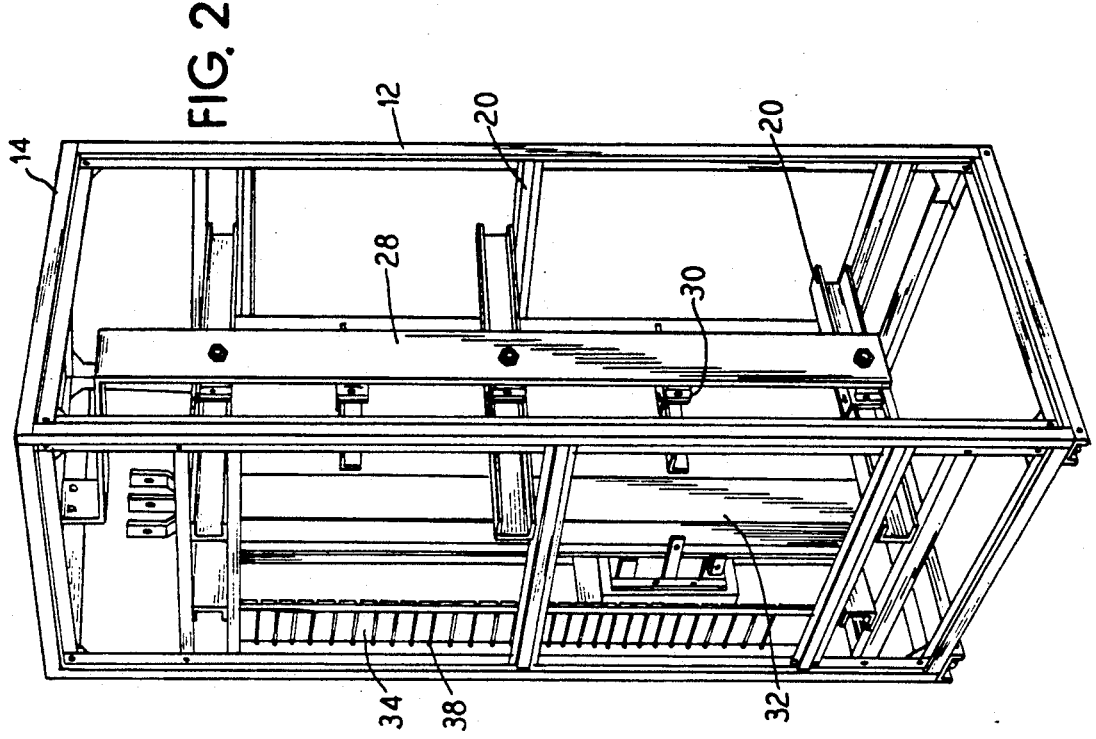
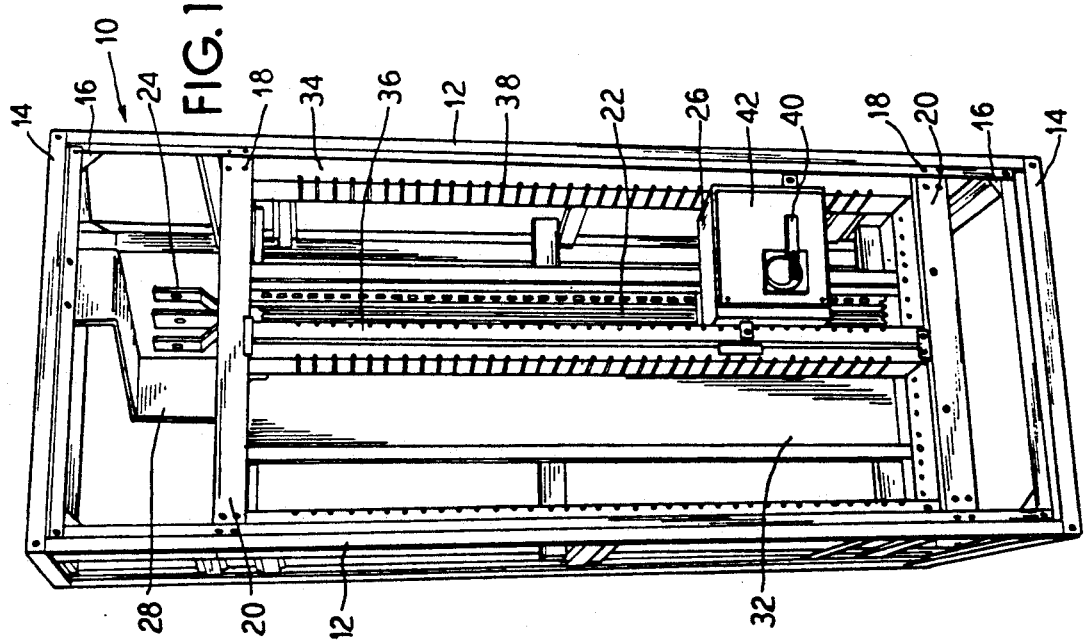

DISTRIBUTION BOARD WITH REAR ELECTRICAL ACCESS

FIELD OF THE INVENTION

The present invention relates to a distribution board for electrical power and particularly to a framework structure supporting busbars and switch modules for electrical connection therebetween.

BACKGROUND OF THE INVENTION

It is known to provide modular arrangements for use in industrial power distribution which include molded case circuit breakers of standard dimensions that are adapted to be plugged onto busbars to establish their electrical connection, e.g., British Patent Nos. 1,161,030 and 1,181,893. An example of a fuse switch unit utilizing a similar modular arrangement is disclosed in U.S. Pat. No. 4,496,916. The entire teachings and disclosures of these patents are incorporated by reference herein.

Due to the physical constraints of many installations, it is desirable to minimize the width of the distribution board utilizing such a modular arrangement. To overcome this problem, the electrical connections to the modular circuit breaker must be accessed other than from the sides of the module. For safety, the incoming line and bus still must be protected against incidental contact with an operator or with outgoing branch lines.

Another problem encountered by distribution boards using the modular arrangement and handling larger currents is making the electrical connection between the modular switch and the bus. When resilient contact jaws are used by the switch module, the force required to make the electrical connection is large. Installation becomes more difficult if the appropriate force can not be applied in a direct manner.

The art needs a new and improved distribution board which utilizes a framework allowing electrical connections to be made through the rear portions of these modular arrangements wherein set-up, expansion, and replacement of switch modules within a support framework is safe, inexpensive and quick. The present invention provides such an improved distribution board.

SUMMARY OF THE INVENTION

The new and improved distribution board of the present invention provides rear electrical access through a framework defining a rectangular shape having a front, rear and side faces. Within the framework is a switch compartment defined by the front face of the framework, by a pair of side panels disposed in a parallel relation to each other and perpendicular to the front face of the framework, and by a bus partially defining the rear wall of the switch compartment opposite the front face of the framework. One side of the bus is adapted for electrical connection and faces the switch compartment.

The distribution board of the present invention also includes a terminal compartment defined by the rear and side faces of the framework, by the side of the bus facing away from the switch compartment and by an opening adjacent to and in the same plane as the bus. The terminal compartment is electrically insulated from the bus. The opening allows electrical connections between output terminals on the rear face of the switch module and outgoing lines in the terminal compartment.

Preferably, the distribution board includes means for imparting sufficient force between the switch module and bus to make a resilient clamp electrical connection therebetween. A fulcrum is affixed to the front face of the framework and is adapted to receive one end of a lever, whereby the other end of the lever is positioned to push on the front face of the switch module to engage the bus.

The present invention also includes an electrical distribution board for distributing an incoming main line through a switch unit to an outgoing line. The distribution board includes a framework defined by vertical and horizontal structural members and corner joints securing the ends of the members together. Cross-members are secured to the vertical members.

The board includes at least one bus secured to the cross-members in a vertical position and towards the rear of the framework. The bus is electrically insulated from the framework with at least one electrical terminal adapted for connection thereto from the front of the framework.

At least one pair of side panels is secured to the cross-members in a parallel position to one another and in a perpendicular position relative to the bus. The side panels are positioned between the front of the framework and the bus. Each side panel includes a plurality of slots extending horizontally across the width of the side panel and spaced at regular intervals. The slots are adapted for receiving a correspondingly shaped mounting bracket from the switch module.

The board also includes an interface positioned adjacent to and in the same plane as the bus. The interface provides access for an electrical connection between the switch module and the outgoing lines.

The present invention also provides a switch unit which includes a housing having a generally rectangular shape formed by a front, rear and side faces. Positioned on the rear face of the housing are an input terminal for resilient engagement with a bus and an output terminal for connection with outgoing lines.

The switch unit also includes a switch operating mechanism positioned within the housing. The mechanism includes two separable switch contacts electrically connected to the input and output terminals and a shaft operable to open and close the contacts. The shaft extends through the front face to the exterior of the housing to engage a handle.

The switch unit includes a mounting means on the exterior of the housing for perpendicularly positioning the housing relative to the bus and enabling movement of the housing to provide sufficient force perpendicular to the bus for resiliently engaging the input terminal thereto.

One object of the present invention is to provide a support framework which allows inexpensive set-up, addition, or replacement of one or more switch modules to a bus.

Another object is to provide all incoming and outgoing electrical connections through the rear portion of the switch modules.

Still another object is to provide safety protection against incidental contact with electrical connections or arcs from the operation of the switch modules.

A further object of the invention is to ease engaging the switch module to the bus by orientating the appropriate force in a straightforward direction therebetween.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 1 is a front perspective view of a distribution board of the present invention;

FIG. 2 is a back perspective view of the distribution board illustrated in FIG. 1;

DETAILED DESCRIPTION

Figure 3:
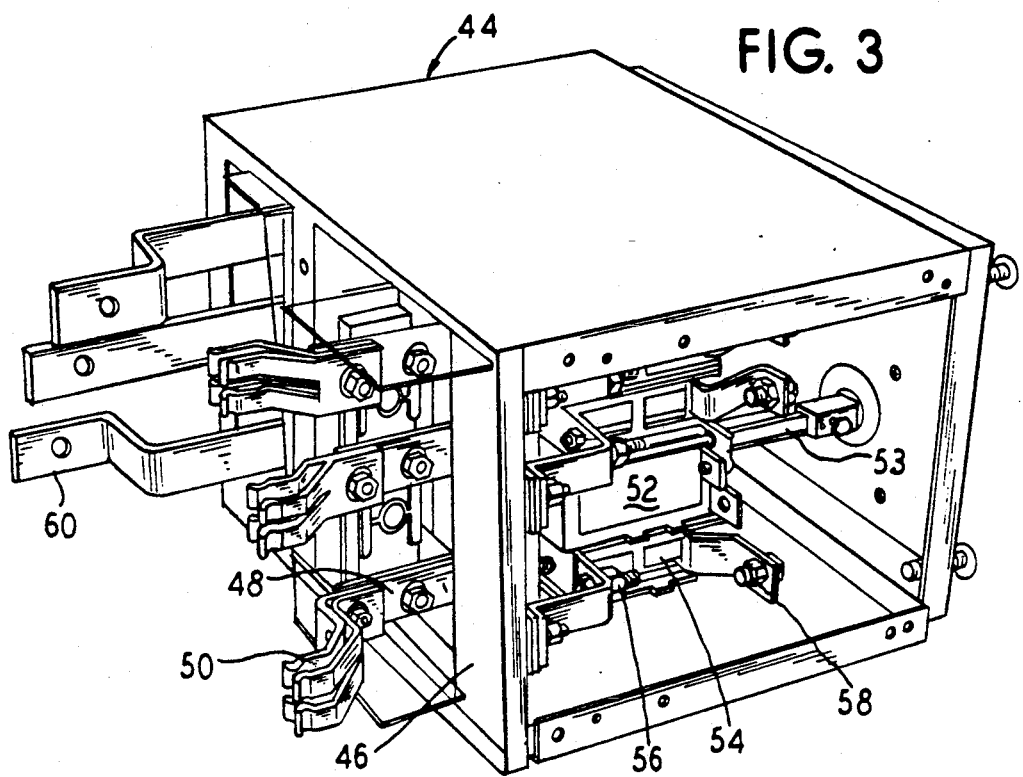
FIG. 3 is a back perspective view detailing the electrical connectors extending from a switch module of the present invention.

Referring to FIGS. 1 and 2, the distribution board of the present invention includes a framework structure generally designated as 10. The framework incorporates vertical structural components 12 and horizontal structural components 14 connected together by corner joints 16 to form a generally rectangular shape.

Preferably, the structural members contain a number of pre-formed holes 18 spaced at regular intervals for the attachment of cross-members 20 within the framework 10. The cross-members 20 reinforce the framework 10 and provide a support platform for mounting components within the framework 10.

Attached to the cross-members 20 is an electrical distribution board or bus 22 which is preferably a multiphase I-Line TM bus distribution board produced by the Square D Company. The multiphase bus 22 is mounted in a vertical position towards the rear of the framework 10. Electrical connection from an incoming main line (not shown) is made to the top 24 of the multiphase bus 22 while outgoing branch lines are made through a switch module or housing 26 to the multiphase bus 22 from the front of the framework 10 while simultaneously allowing multiple side-by-side connections along the length of the multiphase bus 22.

A neutral bus 28 is attached to the cross-members 20 through insulators 30 in a parallel but more rearwardly disposed position in the framework 10 relative to the multiphase bus 22. A shield 32 is positioned between the neutral bus 28 and the multiphase bus 22 to prevent incidental contact.

The framework 10 is designed so that the multiphase bus 22 and the neutral bus 28 can be supported in a 180 degree position and connected at the bottom of the framework 10. The present invention also contemplates connecting more than one multiphase bus 22 within a framework 10 or with a horizontal through-bus (not shown) to another framework or distribution board. This would apply to more than one neutral bus 28 as well.

Pairs of side panels 34, 36 are mounted vertically within the framework 10 and in a perpendicular position relative to the multiphase bus 22. Each side panel like 34 has a plurality of slots 38 spaced at regular intervals to correspond to the length of the multiphase bus 22. Each slot 38 substantially extends across the width of the side panel 34 in a direction perpendicular to the multiphase bus 22. The slots 38 on each pair of side panels 34, 36 are adapted to receive the housing 26 from the front of the framework 10 allowing the housing 26 to slide along the length of the slot 38 towards the rear.

Within the framework 10 is a switch compartment for receiving the switch module 26 which is defined by the front face of the framework 10, by the pair of side panels 34, 36 disposed in a parallel relation to each other and perpendicular to the front face of the framework 10, and by the multiphase bus 22 partially defining the rear wall of the switch compartment opposite the front face of the framework 10. One side of the multiphase bus 22 is adapted for electrical connection and faces the switch compartment.

The framework 10 also includes a terminal compartment defined by the rear and side faces of the framework 10, by the side of the multiphase bus 22 facing away from the switch compartment and by an opening adjacent to and in the same plane as the multiphase bus 22. The terminal compartment is electrically insulated from the multiphase bus 22. The opening essentially forms an interface adjacent to and in the same plane as the multiphase bus 22. The interface provides access for an electrical connection between the switch module and the outgoing lines. As will be discussed below, the opening allows electrical connections between output terminals on the rear face of the switch module and outgoing lines in the terminal compartment.

Figure 4:
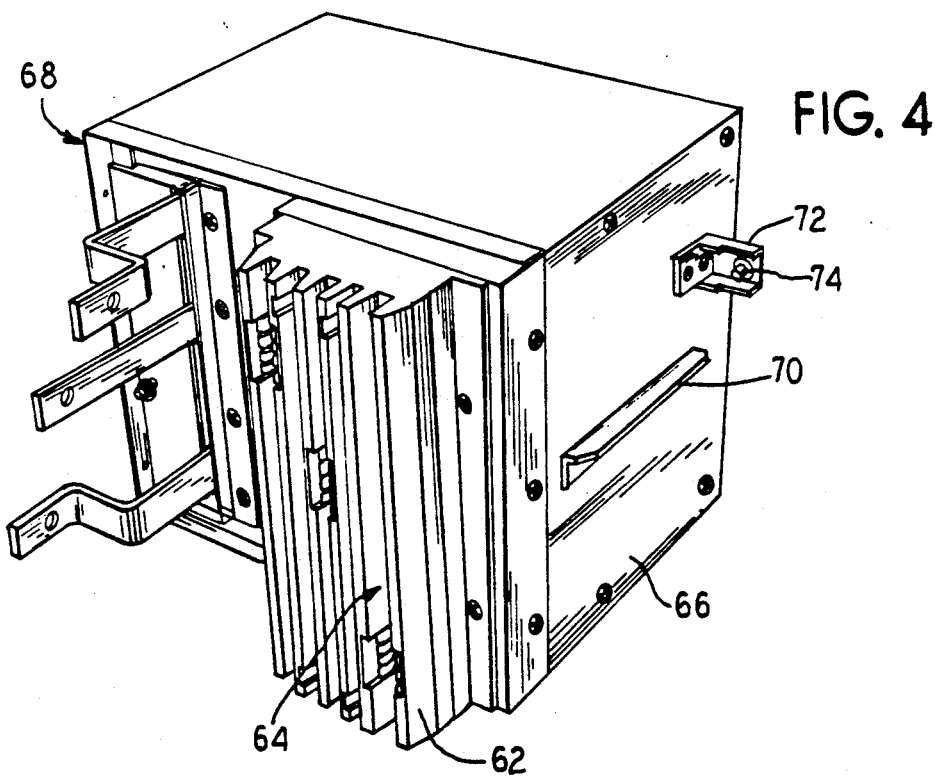
FIG. 4 is the back perspective view of FIG. 3 with a side mounting panel and insulating shroud attached to the switch module.

Preferably, the housing 26 contains a switch such as a fuse switch or circuit breaker. The on-off position of the switch is controlled by an exterior handle 40 mounted on the front face 42 of the housing 26. One switch unit contemplated by the present invention is the fuse switch 44 is illustrated in more detail in FIGS. 3 and 4. The rear face 46 of the housing provides at least one input terminal 48 for the fuse switch 44. Each input terminal 48 includes a contact jaw 50 for electrical connection to the multiphase bus 22. Normally, a switch and fuse is provided for each of phases used.

The input terminal 48 is located on the rear face 46 of the housing and is connected to a switch operating mechanism generally indicated as 52 located within the housing. The switch operating mechanism 52 includes a stationary switch contact which cooperates with a moveable switch contact blade to make and break the circuit (not shown). A shaft 53 connects the switch operating mechanism 52 with the exterior handle 40. The circuit passes through a fuse link means 54 having a pair of fuse lugs 56, 58 and a fuse (not shown) to output terminals 60 also located on the rear face of the housing 46. The fuse link means 54 for all of the phases are aligned together and positioned adjacent the switch operating mechanism 52 in side-by-side relation. The fuse link means 54 is further positioned in the same plane as the input terminal 48.

The present invention contemplates the use of the fuse switch 44 with a wide variety of fuse capabilities. The fuse lugs 56, 58 can be attached to adaptor plates to provide the flexibility of using fuses conforming to a variety of international standards.

The output terminals 60 are staggered to promote ease of electrical connection to the outgoing lines. As is specifically illustrated in FIG. 2, the staggered output terminals extend rearwardly past the shield 32 to an area safely distanced from the multiphase bus.

Returning to FIG. 4, the contact jaws 50 extending from the rear face 46 of the housing are enclosed by a finned insulating shroud 62 forming a terminal channel 64 for each contact jaw 50. Each contact jaw 50 is specifically positioned in one channel 64 separated from the other contact jaws and channels. This "stab and shroud" structure is designed for use with the I-Line ™ bus distribution boards produces by the Square D Company. Other structures suitable for insulating multiple input terminals from one another as they engage the multiple phases of a bus are contemplated by the present invention.

The housing 26 has a pair of side faces 66, 68 which incorporates a mounting means. A mounting bracket or flange 70 horizontally extends across the side face 66 of the housing to provide a mounting member for engaging the slots 38 on the side panel 36.

The housing 26 is affixed to the framework 10 by a securing bracket 72 which outwardly extends from the side face 66 and is located in close proximity to the front face 42 of the housing. The securing bracket 72 extends perpendicularly from the side face 66 and contains an aperture 74 for receiving a fastener 76. Preferably, a self-tapping metal sheet screw is used as the fastener 76.

Figure 5:
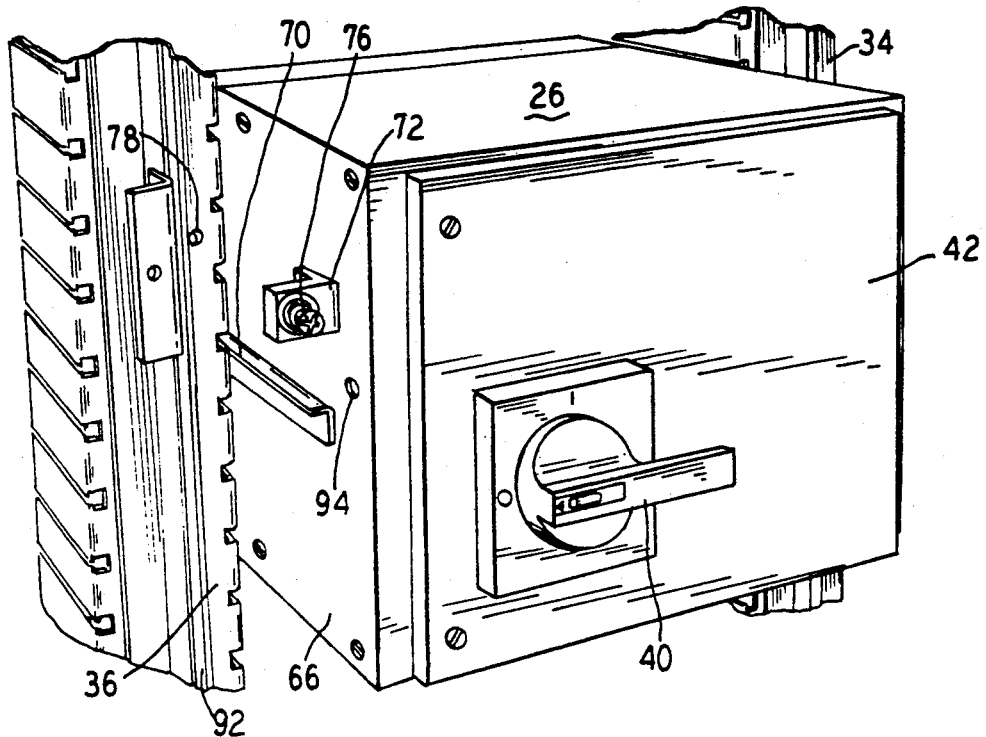
FIG. 5 is a partial front perspective view of the switch module of FIG. 3 positioned for mounting in the framework structure of the present invention.
Figure 6:
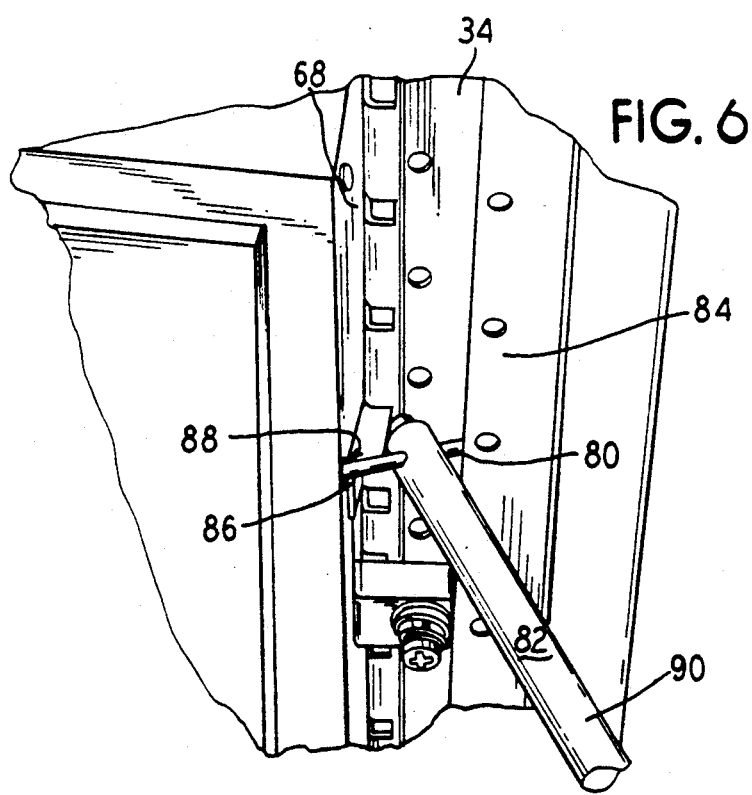
FIG. 6 is a partial front perspective view of a tool promoting final mounting of the switch module in the framework structure.

The mounting position of the housing 26 to the framework 10 is shown in FIGS. 5 and 6. The mounting bracket or flange 70 extends outwardly from the side face 66 of the housing engages the slot 38 formed in the side panel 36 of the framework 10. The flange 70 slides within the slot 38 as the housing 26 is pushed rearwardly to engage the resilient input terminals 48 mounted in the channels 64 of the shroud 62 with the multiphase bus 22. Lateral movement of the housing 26 is restricted by close tolerances between the side panels 34, 36 and the side faces 66, 68 of the housing. Once the electrical connection is made, the securing bracket 72 abuts the front face of the side panel 36. A fastener 76 carried by the securing bracket 72 engages a corresponding hole 78 in the front face of the side panel 34 to secure the housing 26 to the framework 10 and subsequently the electrical connection between the multiphase bus 22 and input terminals 48.

Although the contact jaws 50 of the input terminals 48 are resilient, the contact jaws 50 still resist engaging the multiphase bus 22. Force in excess of 100 lbs. is usually needed to overcome the resistance between the contact jaws 50 and the multiphase bus 22. To assist in applying the necessary force, a fulcrum 80 of a "T"-shaped lever 82 is used to engage the underside of a flange 84 of the vertical structural component 12 while the lever end 86 opposite the fulcrum 80 engages a mounting hole 88 pre-formed in the side face 66 of the housing. The lever handle 90 is then moved to push the entire housing 26 rearward while the flange 84 remains stationary to act as the fulcrum. Preferably, a second lever (not shown) is used to simultaneously exert force on the opposite side face 68 of the housing. A flange 92 is provided on the side panel 36 and a second mounting hole 94 is pre-formed in the opposite side face 68 of the housing to engage the lever as described above.

Preferably, the distribution board includes means for imparting sufficient force between the switch module and bus to make a resilient clamp electrical connection therebetween. A fulcrum is affixed to the front face of the framework and is adapted to receive one end of a lever, whereby the other end of the lever is positioned to push on the front face of the switch module to engage the bus.

After installation of the switch modules 26 into the framework 10, pre-formed narrow vertical trim strips (not shown), cover the securing bracket 72 and slots 38. Similarly, cover plates for spare switch module locations are installed to meet safety and aesthetic requirements. Protective panels are installed on the faces of the framework 10 to conform to international safety standards for protection against live parts and barriers to confine arcs, etc. to compartments within the framework 10.

While particular embodiments and applications of the present invention have been illustrated and described, it is to be understood that the invention is not limited to the precise construction disclosed herein and that modifications, changes, and variations which will be apparent to those skilled in the art may be made in the arrangement, operation, and details of construction of the invention disclosed herein without departing from the spirit and scope of the invention as defined in the appended claims.

What is claimed is:

1. An electrical distribution board comprising:
    a framework defining a rectangular shape having a front, rear and side faces:
    a switch compartment within the framework defined by the front face of the framework, by a pair of side panels disposed in a parallel relation to each other and perpendicular to the front face of the framework, and by a bus partially defining the rear wall of the switch compartment opposite the front face of the framework, the side panels and bus being secured to the framework, the bus being electrically insulated from the framework and having one side facing the switch compartment adapted for electrical connection;
    a terminal compartment defined by the rear and side faces of the framework, by the side of the bus facing away from the switch compartment and by an opening adjacent to and in the same plane as the bus, the terminal compartment being electrically insulated from the bus, the opening of sufficient size to allow electrical connections therethrough, whereby, a switch module is mounted in the switch compartment to electrically connect inlet terminals on the rear face of the switch module to the bus and to electrically connect outlet terminals from the rear face of the switch module through the opening to outlet lines in an area electrically insulated from the bus.

2. The distribution board of claim 1 wherein the framework further includes means integrally formed therewith for imparting sufficient force between the switch module and bus to make a press-fit electrical connection therebetween.

3. The distribution board of claim 2 wherein the imparting means includes a fulcrum formed by a flange affixed to the front face of the framework, the fulcrum adapted to receive one end of a lever, whereby the other end of the lever is positioned to push on the switch module.

4. The distribution board of claim 1 wherein the terminal compartment further includes a neutral bus secured to the framework in a position parallel to the bus.

5. A electrical distribution board for distributing an incoming main line through a switch unit to an outgoing line, the distribution board comprising:

a framework defined by a plurality of vertical and horizontal structural members and corner joints securing the ends of the members together;

a plurality of cross-members having ends secured to the vertical members;

a bus secured to the cross-members in a vertical position and towards the rear of the framework, the bus being electrically insulated from the framework and having at least one electrical terminal adapted for connection thereto from the front of the framework;

a pair of side panels secured to the cross-members in a parallel position to one another and in a perpendicular position relative to the bus, the side panels further positioned between the front of the framework and the bus, each side panel having a plurality of slots extending horizontally across the width of the side panel and spaced at regular intervals, the slots adapted for receiving a correspondingly shaped mounting bracket from the switch module;

an interface defined through the rear of the framework, the interface positioned adjacent to and in the same plane as the bus, the interface providing an access opening for an electrical connection between the switch module and the outgoing lines.

6. The distribution board of claim 5 wherein the bus is a multiphase I-Line bus.

7. The distribution board of claim 5 wherein the board further includes a neutral bus secured to the cross-members in a vertical position parallel to the bus.

8. The distribution board of claim 5 wherein the vertical structural members further include a flange extending outwardly from the framework, the flange adapted to act as a fulcrum for a lever, whereby the opposite end of the lever pushes against the switch module to engage the bus.

9. The distribution board of claim 5 wherein the board further includes a switch module having a generally rectangularly shaped housing formed by a front, rear and side faces, the rear face of the housing having an input terminal for resilient engagement with the bus and an output terminal for connecting with the outlet lines, each side face having a flange extending horizontally across the width of the side face, each flange adapted to engage one of the slots and support the weight of the module.

10. The distribution board of claim 9 wherein each side face of the housing further includes a securing bracket extending outwardly in close proximity to the front face of the housing.

11. The distribution board of claim 9 wherein the each side face of the housing includes a aperture in close proximity to the front face of the housing, the aperture adapted for receiving one end of a lever, whereby the other end of the lever is positioned against a fulcrum to push the switch module into electrical engagement with the bus.

12. A switch unit comprising:

a housing having a generally rectangular shape formed by a front, rear and side faces;

an input terminal positioned on the rear face of the housing for resilient engagement with a bus;

an output terminal positioned on the rear face of the housing;

a switch operating mechanism positioned within the housing, the mechanism having two separable switch contacts electrically connected to the input and output terminals, the mechanism including a shaft operable to open and close the contacts, the shaft extending through the front face to the exterior of the housing to engage a handle;

mounting means on the exterior of the housing for perpendicularly positioning the housing relative to the bus and enabling movement of the housing to provide sufficient force perpendicular to the bus for resiliently engaging and disengaging the input terminal thereto, the mounting means having an aperture located on each side face in close proximity to the front face of the housing, the aperture adapted for receiving one end of a lever.

13. The switch unit of claim 12 wherein the mounting means further includes a mounting bracket having a flange extending perpendicular from each side face with the length of the flange extending across the width of each side face, each flange adapted to engage a slot and support the weight of the housing.

14. The switch unit of claim 12 wherein the mounting means further includes a securing bracket extending perpendicularly from each side face of the housing, each securing bracket positioned in close proximity to the front face of the housing.

15. The switch unit of claim 12 wherein the unit further includes a fuse link means positioned in the housing, the fuse link means being electrically connected in series with the input terminal, separable contacts, and output terminal, the fuse link means having fuse lugs mounted adjacent to the switch operating mechanism, parallel to the side face of the housing and in the same plane as the input terminal.

16. The switch unit of claim 12 wherein the unit further includes an insulating shroud mounted on the exterior of the rear face of the housing having parallel laterally extending portions overlapping each input terminal and a portion of the respective bus connected thereto.

17. The switch unit of claim 12 wherein the output terminals are staggered in different planes as they emerge from the rear face of the housing.

* * * * *